United States Patent [19]

Sacco et al.

[11] Patent Number: 4,917,203
[45] Date of Patent: Apr. 17, 1990

[54] RADIATOR COVER FOR MOTOR VEHICLES

[75] Inventors: Bruno Sacco; Johann Tomford, both of Sindelfingen, Fed. Rep. of Germany

[73] Assignee: Daimler-Benz AG, Stuttgart, Fed. Rep. of Germany

[21] Appl. No.: 270,690

[22] Filed: Nov. 14, 1988

[30] Foreign Application Priority Data

Nov. 13, 1987 [DE] Fed. Rep. of Germany ....... 3738505

[51] Int. Cl.⁴ ............................................. B60K 11/04
[52] U.S. Cl. .................. 180/68.6; 180/69.21; 293/132; 296/189
[58] Field of Search ................ 180/69.21, 69.2, 68.6; 293/115, 132; 296/901, 132, 189

[56] References Cited

U.S. PATENT DOCUMENTS 2,041,522   5/1936   Breer ................................. 180/69.21
4,763,468   6/1988   Szymczak ........................ 180/68.6

FOREIGN PATENT DOCUMENTS 1944884   3/1971   Fed. Rep. of Germany .
0031846   3/1981   Japan ................................. 180/68.6

Primary Examiner—David M. Mitchell
Attorney, Agent, or Firm—Barnes & Thornburg

[57] ABSTRACT

A radiator cover for motor vehicles is used for fastening a radiator grill which is provided to protect and cover a heat exchanger arranged behind it for the engine cooling water. The radiator cover is fastened to the engine hood. A flush surface configuration between the radiator cover and the engine hood is advantageous for aerodynamic reasons. Known radiator covers are produced from metal and welded to the engine hood. Damage to the radiator cover, which involves high repair costs, occurs even in the case of minor collisions. The radiator cover according to the invention is produced from hard elastic plastic and fastened detachably to the engine hood. It projects into the region of the bumper and can execute a resilient yielding movement relative to the engine hood.

7 Claims, 2 Drawing Sheets

RADIATOR COVER FOR MOTOR VEHICLES

BACKGROUND AND SUMMARY OF THE INVENTION

This invention relates to a radiator cover for motor vehicles comprising an approximately U-shaped frame to receive a radiator grill which is fastened to an engine hood, the surface contour terminating flush with the engine hood.

Radiator covers of this type are known in motor vehicle technology.

The radiator cover comprises a frame to which a radiator grill is fastened to protect and cover a heat exchanger arranged behind it for the engine cooling water. The radiator cover of approximately U-shaped construction is fastened to the engine hood. A flush configuration between the surface contours of the radiator cover and the engine hood is desired, particularly for aerodynamic reasons. Known radiator covers of this type are produced from metal and connected firmly to the engine hood. Even minor collisions may cause damage to the radiator cover. This can involve high repair costs, because in many cases it is necessary to respray the entire engine hood.

An underlying object of the invention is to construct a radiator cover for motor vehicles so that the risk of damage is reduced.

This object is achieved by the present invention in the case of a radiator cover of the type initially mentioned by providing an arrangement wherein the radiator cover, which is produced from hard elastic material, is arranged detachably and resiliently on the engine hood, a recess, into which the lower crossbar of the radiator cover projects, being provided on the upper side of a vehicle bumper.

Due to these advantageous constructions of the radiator cover, no damage occurs in the case of minor collisions. The resilient fastening of the radiator cover permits a yielding movement. If damage should occur the radiator cover can be separated from the engine hood in a simple manner. Repairs can therefore be executed simply and inexpensively.

Other objects, advantages and novel features of the present invention will become apparent from the following detailed description of the invention when considered in conjunction with the accompanying drawings.

DETAILED DESCRIPTION OF THE DRAWINGS

Figure 1:
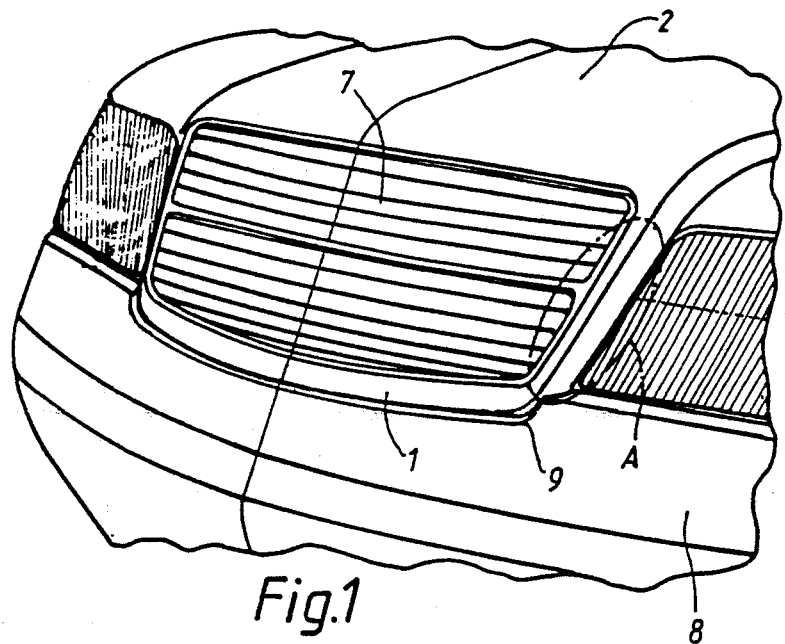
FIG. 1 schematically shows the front section of a vehicle with an embodiment of the radiator cover according to the invention.
Figure 2:
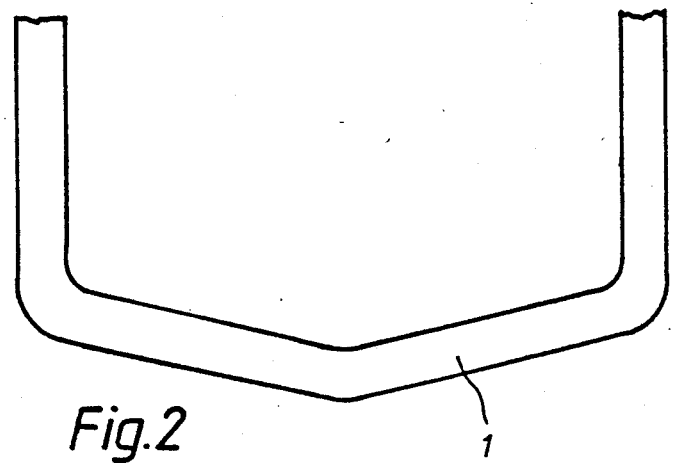
FIG. 2 schematically shows the radiator cover from FIG. 1 in plan view.

The radiator cover 1 shown in FIG. 1 is arranged on the engine hood 2 of the vehicle. The radiator cover 1, which as FIG. 2 shows is of approximately U-shaped construction, is used to fasten a radiator grill 7 which is provided to protect and to cover a heat exchanger arranged behind it for the engine cooling water. The entire front section is constructed so that an approximately flush transition is obtained between the bumper 8, the radiator grill 7 and the engine hood 2. A recess 9, into which the lower crossbar of the radiator cover 1 projects, is provided in the bumper 8. This incorporation of the radiator cover 1 in the front section is advantageous for technical safety and aerodynamic reasons.

In order to reduce the risk of damage, the radiator cover 1 according to the invention is produced from hard elastic plastic. This may be glass fiber reinforced polyurethane, for example. The lower crossbar of the radiator cover 1 has a reinforced construction, because it is located in the region of the bumper 8 and is therefore exposed to higher stresses.

Figure 3:
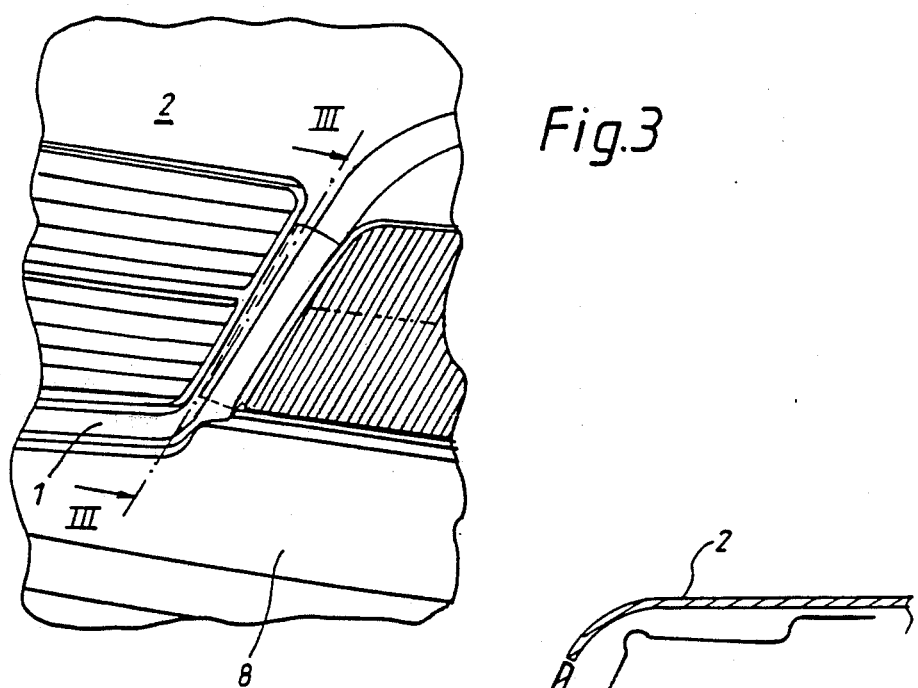
FIG. 3 show the detail A from FIG. 1 on a larger scale.
Figure 4:
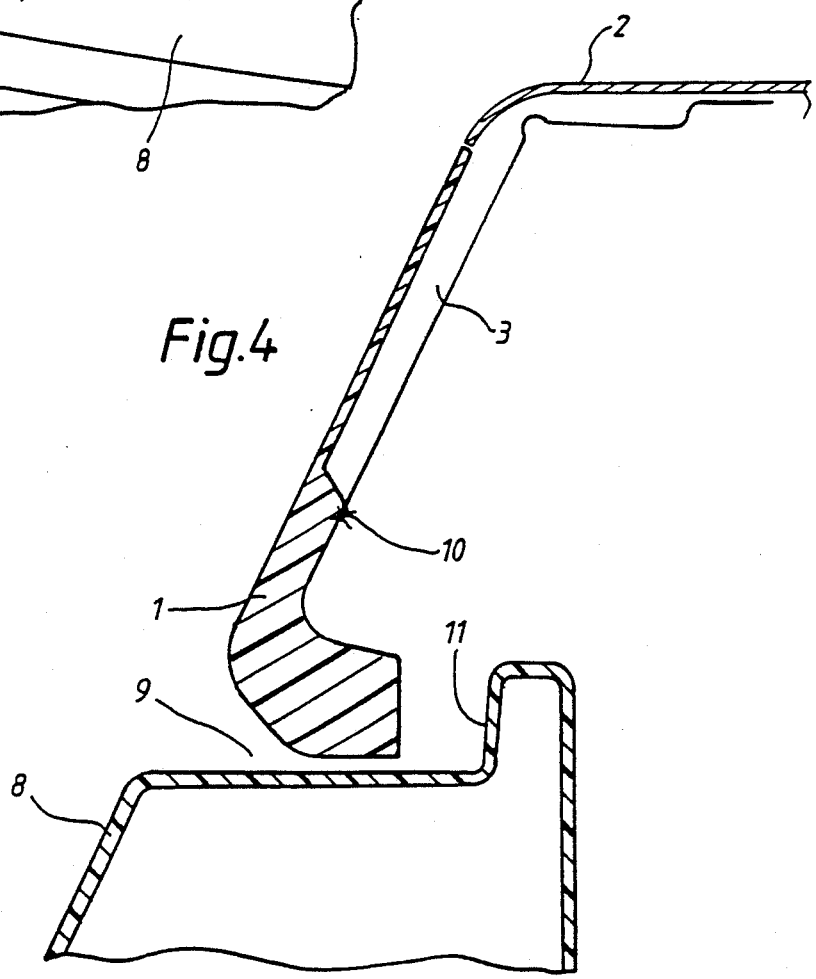
FIG. 4 shows a section taken along the line III—III from FIG. 3.

The fastening of the radiator cover 1 is shown in FIGS. 3 and 4. Inner plates 3, which are fastened to the inside of the engine hood 2, extend into the region of the bumper 8 on both sides of the engine hood 2. The radiator cover 1 i fastened to the free ends of the inner plates 3 by means of the fastening parts 10. A clip connection may preferably be used for this purpose. Easy attachment and removal of the radiator cover 1 to and from the engine hood 2 is thus possible. The detachable connection between the radiator cover 1 and the engine hood 2 reduces the repair costs in the case of possible damage to the radiator cover 1. Particularly, painting operations can be executed separately.

The fastening of the radiator cover 1 to the free ends of the inner plates 3 permits a yielding movement of the radiator cover 1 in the case of collisions. The resilient construction of the inner plates 3 ensures the return of the radiator cover 1 into the normal position after it has been forcefully stressed.

In FIG. 4 the radiator cover 1 is connected to an engine hood 2 which extends only slightly in the direction of the bumper 8. In other embodiments of the invention, the engine hood 2 may extend farther in the direction of the bumper 8, the fastening of the radiator cover 1 to the inner plates 3 remaining unchanged.

As will also be seen from FIG. 4, the recess 9 in the bumper 8 has a vertical stop surface 11 which is arranged offset relative to the radiator cover 1 in the direction of the passenger compartment. In the case of more violent collisions, the further yielding movement of the radiator cover 1 is prevented by the stop surface 11.

In an advantageous embodiment of the invention, the radiator cover 1 and the radiator grill 7 constitutes a plastic component. This plastic component is also produced from hard elastic material.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Radiator cover for motor vehicles comprising an approximately U-shaped frame to receive a radiator grill which is fastened to an engine hood, a surface contour of the radiator grill terminating flush with the engine hood, wherein inner plates, each having a free end and resilient construction, are fastened at an opposite end thereof to an inside of the engine hood and extend into a region of a vehicle bumper on both sides of the engine hood, and wherein the radiator cover, which is produced from an elastic material, is arranged detachably and resiliently on the engine hood by attachment to the inner plates, a recess, into which a lower crossbar of the radiator cover projects, being provided on an upper side of the vehicle bumper.

2. Radiator cover according to claim 1, wherein the inner plates extend downwardly towards the area of the vehicle bumper.

3. Radiator cover according to claim 2, wherein the radiator cover is fastened to the inner plates by means of fastening parts which are arranged at the free end of the inner plates.

4. Radiator cover according to claim 3, wherein the recess has a vertical stop surface which is arranged offset relative to the radiator cover in the direction of the passenger compartment.

5. Radiator cover according to claim 4, wherein a radiator grill and the radiator cover constitute a plastic component.

6. Radiator cover according to claim 1, wherein the opposite ends of the inner plates are directly fastened to the inside of the engine hood.

7. Radiator cover for motor vehicles comprising an approximately U-shaped frame to receive a radiator grill which is fastened to an engine hood, a surface contour of the radiator grill terminating flush with the engine hood, wherein inner plates, each having a free end and a resilient construction, are fastened at an opposite end thereof directly to an inside of the engine hood and extend downwardly towards a region of a vehicle bumper on both sides of the engine hood, and wherein the radiator cover, which is produced from an elastic material, is arranged detachably and resiliently on the engine hood by attachment to the inner plates, a recess, into which a lower crossbar of the radiator cover projects, being provided on an upper side of the vehicle bumper.

* * * * *